Figure 1:
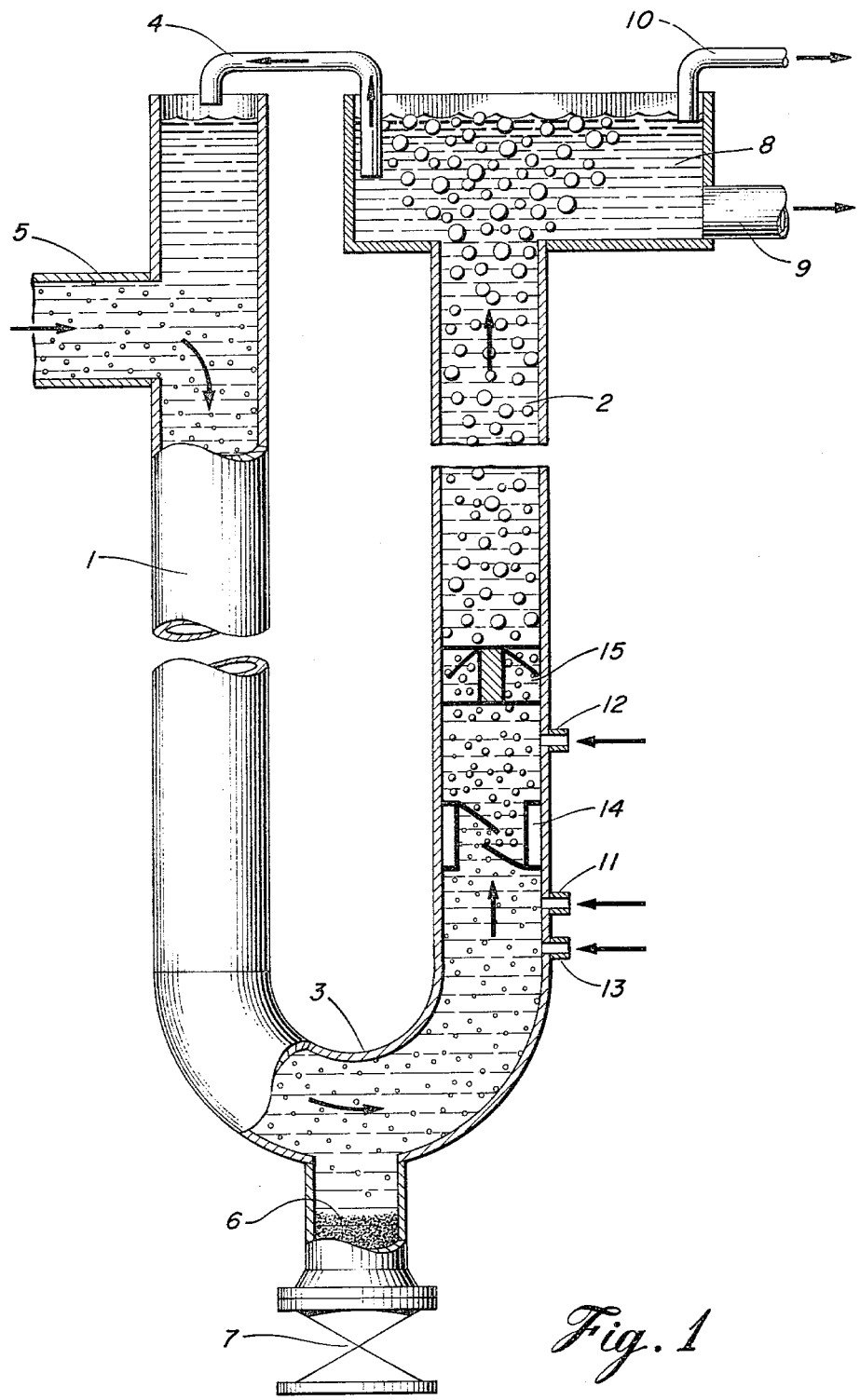

United States Patent [19]

Grimsley

[11] 4,251,361
[45] Feb. 17, 1981

[54] HYBRID GAS FLOTATION SEPARATOR

[75] Inventor: R. Leroy Grimsley, Ponca City, Okla.

[73] Assignee: Conoco, Inc., Ponca City, Okla.

[21] Appl. No.: 93,716

[22] Filed: Nov. 13, 1979

[51] Int. Cl.³ .............................................. C02F 1/24
[52] U.S. Cl. .................................. 210/703; 210/170; 210/708; 210/221.2; 166/357
[58] Field of Search .................. 210/7, 14, 15, 13, 44, 210/43, 221 P, 170, DIG. 25, DIG. 26, DIG. 27; 405/60; 166/357

[56] References Cited

U.S. PATENT DOCUMENTS

| | | | |
|---|---|---|---|
| 3,301,779 | 1/1967 | Kovacs | 210/221 P |
| 3,448,044 | 6/1969 | Garrett | 210/13 |
| 3,725,264 | 4/1973 | Wheeler | 210/44 |
| 3,945,918 | 3/1976 | Kirk | 210/44 |
| 3,977,970 | 8/1976 | Willis et al. | 210/44 |
| 4,031,006 | 6/1977 | Ramirez | 210/221 P |
| 4,066,540 | 1/1978 | Wada | 210/221 P |
| 4,069,149 | 1/1978 | Jackson | 210/44 |
| 4,086,160 | 4/1978 | Roesler | 210/221 P |
| 4,108,768 | 8/1978 | Sebelik | 210/44 |
| 4,186,087 | 1/1980 | Kato | 210/44 |
| 4,198,300 | 4/1980 | Williams | 210/DIG. 25 |

FOREIGN PATENT DOCUMENTS 1473665 5/1977 United Kingdom ....................... 210/14
1478555 7/1977 United Kingdom ................. 210/221 P

OTHER PUBLICATIONS

The ICI Deep Shaft Aeration Process for Effluent Treatment, Reprint from the 29th Annual Atlantic Canada Section, AWWA, Meeting, hosting the 6th Annual FACE Meeting, Sep. 12–15, 1976, Halifax, Nova Scotia, Canada.

*Primary Examiner*—Ernest G. Therkorn
*Attorney, Agent, or Firm*—Cortlan R. Schupbach, Jr.

[57] ABSTRACT

Oil and water mixtures are separated in a gas flotation separator by passing the mixture downward in a vertically elongated portion, and then upward in a vertically elongated portion. A gas such as air is injected near the lower end of the upward flow leg of the separator. The gas is injected at a sufficient hydrostatic pressure to effect dissolving of a substantial portion of the gas in the liquid. The upflow leg has a chamber for oil flotation. Oil removal as well as water removal from respective layers is provided. The separation of oil and water is enhanced by both upwardly bubbling gas and exsolving gas.

7 Claims, 1 Drawing Figure

HYBRID GAS FLOTATION SEPARATOR

This invention relates to a hybrid gas flotation separator. More particularly, this invention relates to a hybrid gas flotation separator which comprises a downwardly flowing portion connected to an upwardly flowing portion such that dissolved gases injected near the lowest portion of the separator separate in the upward flowing portion and hasten separation of water and hydrocarbons.

Many apparatus are known for separating dispersed immiscible fluids. These apparatus find use in separating hydrocarbons from aqueous phases in industrial products and from moving water from hydrocarbon phases in petrochemical facilities. Among such apparatus are coalescers. However, coalescers have normally been of complex internal design are not susceptible to maintenance and generally do not allow ease of operation. In addition, many use fixed coalescer media with flow patterns which do not encourage separation.

A second type of device which separates dispersed immiscible fluids are gas flotation devices which utilize the principle of expanding gases hastening separation. Such apparatus are known in the art. Representative of but not exhaustive of such art are U.S. Pat. Nos. 3,525,437; 3,576,738; 3,616,919; 3,725,264; 3,769,207; 3,849,311; 3,853,753; 3,932,282; and 4,086,160.

U.S. Pat. Nos. 3,576,738 and 3,725,264 disclosed air assisted flotation processes whereby an oxygen containing gas such as air is pressured into water containing residual oil and the air is exsolvated in the flotation cell, thereby carrying oil droplets to the top. However, these apparatus require enclosed pressure vessels compression pumps and carefully controlled conditions in order to be effective. These apparatus use a large amount of space and are not entirely practical for situations wherein space is at a premium.

Representative of such high premium operations are offshore oil platforms wherein injection water or discharge water is desired to be hydrocarbon free, yet the weight and space occupied by conventional gas flotation devices would severely limit their use. Therefore there is a pressing need for the separation of dispersed insoluble liquids such as hydrocarbon and water emulsions. The low level hydrocarbon and water emulsions are needed to meet discharge standards and injection well standards in the petroleum industry.

It is therefore an object of the present invention to provide a hybrid gas flotation separator for the separation of entrained hydrocarbons from aqueous continuous media while not occupying space in space critical applications. Other objects will become apparent to those skilled in this art as the description proceeds.

It has now been discovered according to the instant invention that these objects are met by a hybrid gas flotation separator which allows removal of dispersed liquid hydrocarbons from continuous liquid aqueous phases in an elongated separatory apparatus which does not require enclosed pressure vessels and other pressurizing equipment. The invention can be described as a gas flotation apparatus for separating hydrocarbon water mixtures comprising (a) a first vertically elongated enclosed portion containing an inlet means;
(b) a second vertically elongated enclosed portion;
(c) an enclosed connecting means between said first and said second elongated enclosed portions;
(d) an oil flotation chamber at the upper end of and fluid connection with said second elongated enclosed portion, said chamber having a lower aperature to discharge substantially oil-free water and an upper aperature to discharge recovered hydrocarbons.

The apparatus has the distinct advantage of requiring very little space and using a natural pressure head of water for the separatory function. The apparatus will be suitable for many locations where the site offers natural topographical advantages. Chief among these are offshore well platforms wherein the separatory apparatus can extend below the surface of the water and occupy space which is not used for other purposes. Other applications where well bores are available or where a sheer drop of land such as a cliff is available, allowing use of space normally considered undesirable.

The apparatus can be designed to fit particular applications. However, in general, the application of the apparatus would be in a "polish" operation wherein concentrations of oil of 1,000 parts per million (ppm) or less are removed. Concentrations of oil greater than 1000 ppm are usually removed by upstream gravity type separators. Higher concentrations of oil could of course be removed but would require several of such apparatus whether in series or in parallel operations. In addition, the apparatus can be modified in any number of ways to meet particular requirements. For example, the lower end of the apparatus could contain a settling trap for particulate matter. The operation of the apparatus requires only that gas be inserted at the lower portion of the upwardly flowing leg. However, whether the gas is simply drawn in at ambient pressure or is injected under higher pressure, or both, is entirely the descretion of the operation and depends somewhat upon the mixture to be separated.

As the hydrocarbon/water fluid descends the downward leg, pressure forces move gas into solution. Additional gas is added near the maximum pressure point of the apparatus, normally on the upwardly flowing portion. This gas also goes at least partially into the solution, until the solution is saturated. As the fluid rises, gas solubility levels decrease due to decreasing pressure, and gas leaves solution (exsolves) as small bubbles. Such bubbles draw hydrocarbons to the gas/liquid interface, and hasten phase disengagement. The bubbles become larger as the pressure further decreases and further hastens phase disengagement. Final separation occurs in a flotation chamber, where the gas rises to the top of the liquid (carrying hydrocarbons alone) and escapes, leaving a layer of essentially water-free hydrocarbons atop an essentially hydrocarbon free water layer.

In addition, the apparatus provides for chemical injection of materials useful in facilitating phase separation. Normally, these chemicals will be polymers such as polysaccharides and polyamides, polyacrylamides, polyepichlorohydrins, Guar gums and the like. In addition, polyelectrolytes and demulsification materials can be injected. Also, salts such as potassium chloride, sodium chloride have been used as surface tension reducers. Other well known surface tension reducers include alcohols. All such materials can be used in the practice of the present invention.

Gas is injected into the apparatus such that a residence time of air of from 0.5 to 10 minutes preferably from about 2 to about 4 minutes in the upwardly flowing leg is present. Any gas will be suitable, although gases such as ambient air, reactant gas, carbon dioxide and other common gases will normally be used. Chemical injection is made such that residence time of the chemical is from about 1 to about 600 seconds, preferably from about 15 to 30 seconds.

The point of injection of gas (air, etc) or chemicals can be any point to provide suitable solubility of the air and chemical in the fluid. Normally, the injection is made at a point where the velocity and agitation is high (about 2 feet per second). The apparatus normally has a pressure head of water sufficient to yield dissolved gases at the desired point of concentration. Normally, such a pressure head will range from about 30 to about 150 feet in length, preferably from about 40 to about 80 feet. Such preferred ranges will yield about 0.45 pounds per square inch pressure per foot of height in the water-head.

An optional air injection is provided which allows the insertion of excess air over that soluble in the fluid at the pressure of injection. The excess air acts to help in separation by providing small bubbles which rise much more rapidly than the surrounding fluid. Such injected gas, however, is not necessary.

In addition, the apparatus optionally provides for mixing means at several points in the upwardly flowing portion. Normally, static mixers will be used in which the mixer simply causes turbulent flow in the upwardly moving fluid. Representative examples of such mixers are those sold by Kenics Corporation, although other such mixers can be used.

In addition, powered grid mixers can be inserted in the upwardly flowing elongated portion above the point of air insertion in order to allow mixing of the chemicals injected to lower surface tension and height and help in phase separation. Such mixers drastically change the velocity of the fluid flowing through the second elongated enclosed portion. Normally such velocity increases will range from about 10 to about 64 times that of the fluid flow itself; however, such powered mixers are optional and are not required to achieve satisfactory operation using the apparatus of the present invention.

The separator would normally be submerged in water or placed in a well bore of sufficient depth to achieve the pressure head desired. The apparatus is open to the atmosphere and requires no special pressure equipment.

The invention is more concretely described with reference to the drawing wherein the instant invention is exemplified in a preferred embodiment.

FIG. 1 shows the general structure of the hybrid gas flotation separator of the instant invention.

Specifically described, FIG. 1 is a cut-a-way cross-sectional view of the apparatus. In the figure, (1) is a first vertically elongated portion containing downward flow; (2) is a vertically elongated portion having upward flow; and (3) is a enclosed connecting means between the first and second elongated enclosed portions. Thus the apparatus takes on the shape of a "U", although a simple divided pipe could, of course, be used. The apparatus is open to the atmosphere and contains inlet aperature (5) for insertion of the oil/water mixture into the apparatus. The apparatus optionally provides a settling area (6) as a clean-out trap (7) for removing particulate matter. A flotation chamber (8) is provided atop the second elongated vertical portion (2) for final separation of hydrocarbon and aqueous media. An aqueous discharge (9) is provided as well as an oil removal portion (10).

An air inlet (11) is provided in order to allow saturation of the hydrocarbon/water mixture and is provided at a necessary depth in order to achieve saturation ambient air can be used for this injection. A second air injection, usually made under pressure, is provided (12) such that an excess of air can be placed into the apparatus if desired.

Chemicals for hastening phase separation are injected through port (13). This port position is relative to the optional air injection (12), and is not critical but normally will be below any static mixer (14) which may be in the line. More than one mixer may be provided. Also optionally powered mixers (15) and (16) are shown, each forcing the fluid through a different diameter aperature in order to alter the velocity flow of the fluid.

A recirculation line (4) is optionally provided to recycle a portion of the treated water from the basin (8) to the downwardly flowing leg (1). The recycle line draws fluid from the center portion of the basin where separation of hydrocarbons and water is not complete. Completely separated hydrocarbons are removed via line (10) and cleaned water is removed via line (9).

Thus the present invention uses a combination of dissolved air and dispersed air principles. The advantages are simplicity of design, low construction costs, adaptability to offshore and floating structures, weight and space savings since the apparatus occupies a minimum of horizontal space.

The apparatus utilizes the pressure difference due to a large water head, such a water head being in the range of 0.45 pounds of square inch per foot of water height. Much of the gas introduced at the bottom of the collar is dissolved in the water due to pressure and the separation is much improved since the pressure release is very gentle as the liquid flow goes up, the water head pressure gradually becomes less, dissolved gas gradually comes out of solution (exsolves) and dispersed air bubbles gently increase in size. The pressure release and bubble formation would be much more abrupt on a conventional dissolved air unit which utilizes pressure vessels. The invention provides for excess air (more than will dissolve in the fluid) to be injected near the bottom of the separator. The excess bubbles which are not soluble in the fluid gradually grow in size as the pressure decreases and as they travel up the column toward the surface. This gentle growth allows the dispersed phase to be floated to the surface without careful control since the loss in pressure is automatically adjusted as fluid travel takes place.

Generally, a specific treatment sequence would be followed peculiar to the operation being carried out. However, a normal treatment sequence would be chemical and air injection followed by inline static mixers to mix the chemical or air. Mixers are shown downstream from the gas injection points so that the gas will disperse, dissolve and contact the dispersed oil particles. The mixing and disengagement chemical requirements will vary from location to location and liquid to liquid.

The instant invention is particularly applicable to offshore platform applications. Specific applications on offshore platforms are discharged produced water and discharged water from offshore drilling rigs. However, the separation system could also be used on shore wherein the "U" shape pipe is connected to a tower or tall structure into a well bore or using steep cliff areas. Commercial size unit using the present invention would have a maximum of about 1 foot cross-sectional area in each vertical separation column. This cross-sectional area could, of course, be varied according to the volume of water being treated.

Normally, the residence time of air and chemical in the system will range from about 1 to 10 minutes, although such ranges will, of course, depend upon the particular circumstances.

In operation, for example, assuming a three-inch diameter pipe and a liquid flow rate of about 5 gallons per minute, air would be injected at about 15% of liquid volume flow rate. This would require about 0.25 standard cubic feet per minute of air. The air would occupy about 0.25 cubic feet at the surface and about 0.1 cubic feet at the injection point near the lower end of the upward flowing vertically enclosed column. The average volume of resident air in this column will be about 0.18 cubic feet per minute. Over a 3 minute interval, this air would displace about 0.54 cubic feet of water. The driving force in the 3 inch pipe used for illustration is equivalent to an 11 foot water head or about 4.95 pounds per square inch which is an ample driving force to provide separation and overcome resistance through the mixers, etc. However, this driving force could be increased because of velocity and excess gas is injected into the system. The movement of the gas up the column would increase the velocity of flow.

In addition, air injection could be pulsed to provide pressure changes to coalesce oil particles by change in the size of dispersed and dissolved air bubbles. In addition, the mixer can be constructed of either oil wetable or water wetable materials such as steel or plastic. Slight separation is obtained with such an apparatus.

While certain embodiments and details have been shown for the purpose of illustrating this invention, it will be apparent to those skilled in this art that various changes and modifications may be made herein without departing from the spirit or scope of the invention.

I claim:

1. A gas flotation apparatus for separating hydrocarbon/water mixtures comprising
   (a) a first vertically elongated enclosed portion containing a liquid inlet means,
   (b) a second vertically elongated enclosed portion, said portion containing an air inlet means near the lower end of said portion, a chemical injection means above said air inlet means, and a static mixer means above said chemical injection means, and wherein both first and second vertically elongated enclosed portions are from about 30 to about 150 feet in length;
   (c) an enclosed connecting means between said first and said second elongated enclosed portion;
   (d) a flotation chamber at the upper end of and in fluid communication with said second elongated enclosed portion, said chamber having a lower aperature to discharge substantially oil-free water and an upper aperature or weir to discharge oil.

2. An apparatus as described in claim 1 wherein the connecting means contains a settling trap for particulate matter.

3. An apparatus as described in claim 2 wherein at least one powered mixing means is situated above said air inlet means.

4. A method for separating hydrocarbon/water mixtures on offshore platforms comprising passing said hydrocarbon water mixture downward in a first vertically elongated enclosed portion containing an inlet means and upward through a second vertically elongated enclosed portion containing a flotation chamber at the upper portion thereof while injecting a gas and a chemical for hastening phase separation into the hydrocarbon/water mixture near the lower end of the second vertically elongated enclosed portion and allowing the gas-saturated fluid to rise through static mixing means to the flotation chamber, wherein oil and water are allowed to separate into two distinct phases, then separating the phases to recover substantially oil-free water, wherein both the first and second vertically elongated portions are from about 30 to about 150 feet in length and extend downwardly into water around the offshore platform.

5. A method as described in claim 4 wherein a material selected from the group consisting of polysaccharides, polyamides, polyacrylamides, polyepichlorohydrins, Guar gum, potassium chloride, and sodium chloride are injected into the hydrocarbon/water mixture near the bottom of the upwardly flowing second vertically elongated enclosed portions.

6. A method as described in claim 5 wherein the gas residence time ranges from about 0.5 to about 10 minutes.

7. A method as described in claim 6 wherein a chemical residence time of from about 1 to about 600 seconds is used.

* * * * *